(12) United States Patent
Suresh et al.

(10) Patent No.: US 9,942,628 B2
(45) Date of Patent: Apr. 10, 2018

(54) WEARABLE TECHNOLOGY BASED APPARATUS AND METHOD FOR ACCELERATED ENROLLMENT OF PARALLEL WIRELESS SENSORS INTO THEIR OWN NETWORK

(71) Applicant: Honeywell International Inc., Morristown, NJ (US)

(72) Inventors: Sandeep Suresh, Bangalore (IN); Vishnu Beema, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 380 days.

(21) Appl. No.: 14/587,194

(22) Filed: Dec. 31, 2014

(65) Prior Publication Data

US 2016/0192040 A1    Jun. 30, 2016

(51) Int. Cl.

| | | |
|---|---|---|
| G08C 19/22 | (2006.01) |
| H04Q 9/00 | (2006.01) |
| H04W 4/00 | (2018.01) |
| H04W 4/22 | (2009.01) |

(52) U.S. Cl.
CPC ............ *H04Q 9/00* (2013.01); *H04W 4/001* (2013.01); *H04W 4/008* (2013.01); *H04W 4/22* (2013.01); *H04Q 2209/40* (2013.01); *H04W 4/005* (2013.01)

(58) Field of Classification Search
CPC ......... H04L 63/10; H04L 63/18; H04L 67/12; H04Q 2209/40
See application file for complete search history.

(56) References Cited

U.S. PATENT DOCUMENTS

| | | | | |
|---|---|---|---|---|
| 6,282,183 B1* | 8/2001 | Harris | ............... | G06Q 10/109 370/230 |
| 2004/0212500 A1* | 10/2004 | Stilp | ................ | G08B 19/005 340/541 |
| 2005/0201345 A1* | 9/2005 | Williamson | ....... | G06F 19/3406 370/338 |
| 2012/0047558 A1* | 2/2012 | Sundaram | ......... | H04L 63/0869 726/3 |
| 2013/0176897 A1* | 7/2013 | Wang | ................ | H04W 12/06 370/254 |

(Continued)

FOREIGN PATENT DOCUMENTS

WO    WO 2014/185839 A1    11/2014

OTHER PUBLICATIONS

Extended European search report from corresponding EP patent application 15200615.1, dated Apr. 29, 2016.

*Primary Examiner* — Fabricio R Murillo Garcia
(74) *Attorney, Agent, or Firm* — Husch Blackwell LLP

(57) ABSTRACT

A method and apparatus, the method includes a security system transmitting a beacon, a portable wireless setup device in a geographic location proximate a wireless access point of the security system reading at least a unique identifier of the security system, relocating the setup device to a geographic location proximate one of the plurality of wireless sensors and activating the one wireless sensor, the activated sensor reading the unique identifier of the security system from the setup device and the activated sensor automatically registering with the security system through the access point based upon the unique identifier read from the portable setup device.

20 Claims, 1 Drawing Sheet

(56) References Cited

U.S. PATENT DOCUMENTS

| | | | |
|---|---|---|---|
| 2013/0242840 A1* | 9/2013 | Tolhuizen | H04W 52/0229 370/311 |
| 2014/0036728 A1* | 2/2014 | An | H04W 40/02 370/254 |
| 2014/0191848 A1* | 7/2014 | Imes | H04B 5/0037 340/10.5 |
| 2014/0370879 A1 | 12/2014 | Redding et al. | |
| 2016/0165405 A1* | 6/2016 | Shinozuka | H04W 4/04 455/456.1 |

* cited by examiner

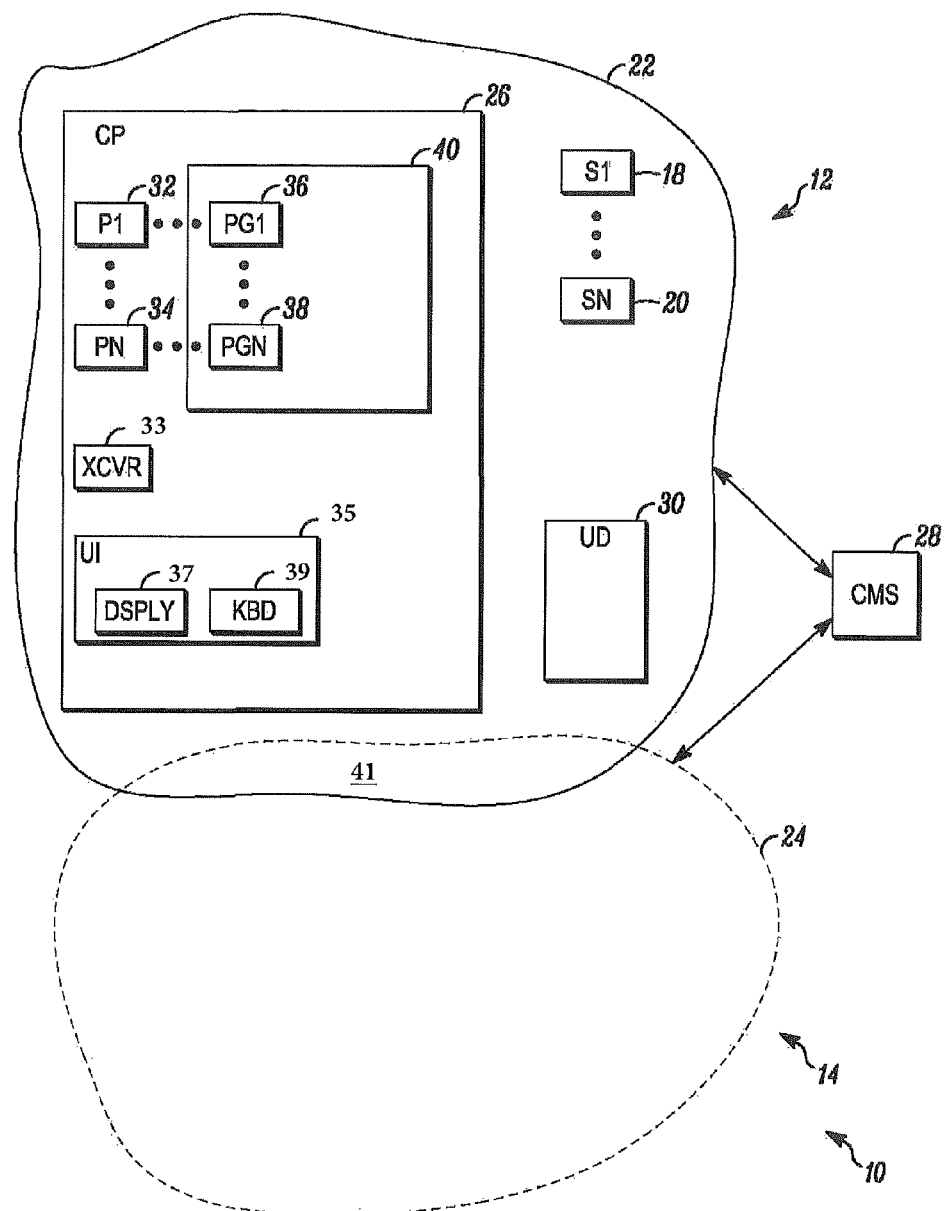

WEARABLE TECHNOLOGY BASED APPARATUS AND METHOD FOR ACCELERATED ENROLLMENT OF PARALLEL WIRELESS SENSORS INTO THEIR OWN NETWORK

FIELD

This application relates to security systems and more particular to the setup of security systems.

BACKGROUND

Systems are known to protect people and assets within secured areas. Such systems are typically based upon the use of one more sensors that detect threats within the secured area.

Threats to people and assets may originate from any of number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within a secured area. Intruders have also been known to injure or kill people living within the area.

In the case of intruders, sensors may be placed and used in different areas based upon the different uses of the secured space. For example, if people are present within some portions of a normal day and not at other times, then some sensors may be placed along a periphery of the space to provide protection while the space is occupied while additional sensors may be placed and used within an interior of the space when the space is not occupied.

In most cases, threat detectors are connected to a local control panel. In the event of a threat detected via one of the sensors, the control panel may sound a local audible alarm. The control panel may also send a signal to a central monitoring station.

While security system work well, they are sometimes difficult to set up and use, especially when large numbers of sensors and different levels of security are involved. Accordingly, a need exists for better methods of expediting such processes.

BRIEF DESCRIPTION OF THE DRAWINGS

FIG. 1 illustrates a block diagram of a security system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a number of security system network 10 shown generally in accordance with an illustrated embodiments. Included within the security system network is a number of respective security systems 12, 14. Each of the respective security systems include a number of wireless sensors devices 18, 20 that detect threats within a respective secured geographic area 22, 24 of the system.

The sensors may be structured to detect any of a number of different types of threats. For example, some of the sensors may be limit switches located on the doors and windows of each of the secured areas and intended to detect the entrance of intruders into the secured area. Similarly, some of the sensors may be passive infrared (PIR) sensors that detect intruders within an interior of one or more of the spaces. Alternatively, the sensors may be based upon the use of a closed circuit television (CCTV) with motion detection capabilities.

Alternatively, the sensors may be structured to detect environmental threats. For example, at least some of the sensors may be smoke or flame detectors. Alternatively, some of the sensors may be gas detectors (e.g., carbon monoxide, natural gas, etc.).

A control panel 26 associated with each of the secured areas may monitor each of the sensors within the area for threats. Upon detecting a threat, the control panel may compose and send an alarm message to a central monitoring station 28. The alarm message may include an identifier of the type of sensor (e.g., intrusion, fire, etc.), an identifier of the secured area (e.g., account number, address, etc.), a identifier of the location of the sensor within the secured area and a time. The central monitoring station may respond by summoning the appropriate help (e.g., police, fire department, etc.).

Also included within the security system network may be a wireless portable setup device 30. The setup device may be used to set up a connection between each of the sensors and a corresponding control panel.

Provided within each of the sensors, control panels and the setup device is a number of processing apparatus (processors) 32, 34, each operating under control of one or more computer programs 36, 38 loaded from a non-transitory computer readable medium (memory) 40. As used herein, reference to a step performed by a computer program is also reference to the processor that executed that step of the program.

Each of the control panels, sensors and the setup device may be provided with a radio frequency (RF) transceiver 33. Upon startup of the respective security systems, the transceiver of the control panel may periodically transmit a beacon identifying the control panel and associated security system. The RF transceiver of the control panel may be a wireless access point operating under an IEEE802.15 protocol.

Upon activation of each of the sensors, the sensor scans a predetermined frequency spectrum for the beacon from the closest control panel. Upon detecting a beacon, a processor within the sensor measures a signal strength of the beacon and saves the information content of the beacon in memory. After a predetermined time period, the sensor selects the beacon with the strongest signal and sends a registration message to the control panel that sent the beacon. The control panel and sensor then proceed to set up a secured connection between the sensor and control panel.

In some cases, a sensor may not be able to detect any nearby control panels. In this case, a nearby sensor may forward signals to and from the control panel as part of a mesh network.

Located within each of the secured areas may also be a respective user interface 35. The user interface may include a display 37 and a keyboard 39.

The user interface may be used by an authorized person (user) to control the respective security systems. In order to arm a security system the user may enter a personal identification number (PIN) and activate a function key (e.g., arm, disarm, arm away, etc.).

A status processor within the control panel may monitor the user interface for instructions from the user. Upon entry of the arm command, a monitoring processor of the security system may assume the armed state. In this state, the security system may monitor all sensors and report any sensor activations to the central monitoring station. In the armed away state, the monitoring processor may only monitor sensors along a periphery of the secured area. In the disarmed state, the monitoring processor may only monitor environmental sensors.

In general, set up of the security system network shown in FIG. 1 can be very difficult and time consuming. For example, when a sensor scans for nearby control panels, the sensor may not find the appropriate control panel. When this happens, the sensor may connect to a control panel of a different security system and within a different secured area. This can lead to a great deal of confusion and can be very time consuming to identify and correct.

In order to solve this problem, the setup device may be used to help sensors identify the correct control panel. In this regard, the setup device may be used by a person responsible for setting up each security system.

Under one illustrated embodiment, the setup device may be based upon the use of a smartphone carried by the setup person. In this example, the smartphone may include a NXP dongle connected to a USB port of the smartphone. A setup program executing within the smartphone allows the smartphone to interact with the control panels and sensors. The NXP dongle allows the smartphone to communicate with the control panel and sensors on RF channels that would not otherwise be available through the smartphone.

In alternate embodiments, the setup device may be an RF6FOB or RF6Pendant operating under an IEEE802.15 format and carried in the pocket of the setup person. Alternatively, the functionality of the setup device may be incorporated into an Apple watch or android device made by Samsung in order to support accelerated enrollment functionality.

In general, the setup device may be carried by the setup person to a geographic location proximate the control panel in order to learn the characteristics of the appropriate control panel. Then, the setup device is carried to a geographic location proximate each of the sensors in order for the sensor to learn the characteristics of the corresponding control panel.

Setup of the sensors may occur automatically based upon information received by each of the sensors from the setup device. As a first step, the setup person may start with the control panel. The setup person may activate the control panel via the user interface. The control panel may immediately begin transmitting a beacon.

The control panel may include an RF6 application (RF6AP) executing on a processor of the control panel that sends an RF beacon at regular intervals. The beacons may be transmitted at a relatively high power level (e.g., +20 dBm). A payload of the beacon may include an identifier of a channel number for registration, a PAN-ID, a MAC-ID and other parameters of the control panel.

Next, the person (wearing the setup device) provides an input in order to bring the same or another RF6 application (executing on the setup device or, in some cases, the setup device and control panel) into an enrollment mode. The portion of the RF6 application executing on a processor of the setup device worn by the person may be referred to as the RF6Wear. The RF6Wear performs a passive scan on all channels used by the control panel in order to locate the beacon of the nearby control panel. The RF6Wear identifies and picks the RF6AP channel used by the nearby control panel based upon a link quality identifier (LQI) value. The RF6Wear then reads the channel number, the PAN-ID, the MAC-ID and other RF6AP parameters from the beacon payload. The values are saved into a memory of the setup device.

The setup person may then individually travel to the geographic location of each of the sensors associated with the control panel. During this time, the RF6Wear periodically sends low-power beacons (e.g., −70 to −110 dBm) on a selected channel (e.g., channel 26). The low-power beacon payload may contain the MAC-ID, the channel number of registration, and the PAN-ID of the corresponding parent control panel.

The beacon from the setup device is heard only by the nearby sensor because of its proximity to the setup device. Accordingly, the beacon signal from the setup device will be blocked and not be heard by any neighboring sensors.

As the setup person approaches each sensor, the person trips or otherwise activates the sensor. Once activated, the sensor may passively scan only the selected channel (e.g., channel 26). Because of the proximity of the setup device, the sensor detects and selects the beacon from the setup device (e.g., based upon LQI). Once selected, the beacon is decoded to recover the channel number for registration, the PAN-ID, the MAC-ID and, possibly, other RF6AP parameters of the parent control panel from the beacon payload and saves the values in the memory of the sensor.

The sensor recognizes the beacon as being from the setup device based upon a source address of the beacon. The sensor, in turn, activates a registration program that modifies its behavior to register with a control panel that may not have the strongest signal. This is important in cases where the sensor is located in an area 41 that may be closer to a neighboring control panel.

Based upon the parent information received from the setup device, the sensor sends an association request on the specific channel, with the specific PAN-ID and MAC-ID recovered from the beacon of the setup device. The corresponding parent control panel may receive the association request and set up a channel connecting the sensor with the parent control panel based upon this information. This may be accomplished via a direct connection between the panel and sensor or indirectly through other sensors via a mesh connection.

In general, the system incorporates a method including a security system transmitting a beacon through a wireless access point located within a secured area, the security system having a plurality of wireless sensors to detect threats within the secured area, providing a portable wireless setup device in a geographic location proximate the wireless access point; the setup device reading at least a unique identifier of the security system from the beacon received through the access point, relocating the setup device to a geographic location proximate one of the plurality of wireless sensors and activating the one wireless sensor, the activated sensor reading the unique identifier of the security system from the setup device and the activated sensor automatically registering with the security system through the access point based upon the unique identifier read from the portable setup device.

Alternatively, the system includes a security system having a plurality of wireless sensors to detect threats within the secured area, a transceiver coupled to a control panel of the security system that transmits a beacon within a secured geographic area, a portable wireless setup device located in the secured area that is carried between the transceiver of the security system and each of the plurality of wireless sensors, that reads a unique identifier of the security system from the beacon of the control panel and retransmits a low-power beacon containing the unique identifier for the benefit of each of the plurality of wireless sensors and a programmed processor within each of the plurality of wireless sensors that reads a unique identifier of the security system from the low-power beacon of the setup device and automatically registers the wireless sensor with the security system through the transceiver of the control panel based upon the unique identifier read from the portable setup device.

Alternatively, the system includes a security system having a plurality of wireless sensors to detect threats within the secured area, a transceiver coupled to a control panel of the security system that transmits a beacon within a secured geographic area, a portable wireless setup device located in the secured area that is carried between the transceiver of the security system and each of the plurality of wireless sensors, that reads a unique identifier of the security system from the beacon of the control panel and retransmits a low-power beacon containing the unique identifier for the benefit of each of the plurality of wireless sensors and a programmed processor within each of the plurality of wireless sensors that reads a unique identifier of the security system from the low-power beacon of the setup device and automatically registers the wireless sensor with the security system through the transceiver of the control panel based upon the unique identifier read from the portable setup device.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:
1. A method comprising:
a control panel of a security system transmitting a first beacon through a wireless access point located within a secured area, wherein the security system includes a plurality of wireless sensors to detect threats within the secured area;
providing a portable wireless setup device in a first geographic location proximate the wireless access point;
the portable wireless setup device reading at least a unique identifier of the control panel from the first beacon received through the wireless access point;
relocating the portable wireless setup device to a second geographic location proximate a first one of the plurality of wireless sensors and activating the first one of the plurality of wireless sensors;
the first one of the plurality of wireless sensors receiving the unique identifier of the control panel from the portable wireless setup device; and
the first one of the plurality of wireless sensors automatically registering with the control panel through the wireless access point based upon the unique identifier of the control panel received from the portable wireless setup device.

2. The method as in claim 1 wherein the first beacon includes a channel number used by the plurality of wireless sensors for registering with the control panel.

3. The method as in claim 1 wherein the unique identifier includes a Permanent Account Number identification (PAN-ID) and a Media Access Control identification (MAC-ID) of the control panel.

4. The method as in claim 1 further comprising the portable wireless setup device transmitting a low power beacon similar to the first beacon transmitted by the control panel through the wireless access point.

5. The method as in claim 4 further comprising a second one of the plurality of wireless sensors detecting the low power beacon from the portable wireless setup device and saving the unique identifier of the control panel received from the portable wireless setup device in a memory of the second one of the plurality of wireless sensors.

6. The method as in claim 1 further comprising each of the plurality of wireless sensors scanning a predetermined frequency spectrum for the first beacon from the wireless access point of the security system.

7. An apparatus comprising:
a control panel of a security system that transmits a first beacon within a secured geographic area, wherein the security system includes a plurality of wireless sensors to detect threats within the secured geographic area;
a wireless access point;
a portable wireless setup device located in the secured geographic area that reads a unique identifier of the control panel from the first beacon and retransmits a low-power beacon containing the unique identifier of the control system; and
one of the plurality of wireless sensors that receives the unique identifier of the control panel from the low-power beacon of the portable wireless setup device and automatically registers with the control panel through the wireless access point based upon the unique identifier received from the portable wireless setup device.

8. The apparatus as in claim 7 wherein the wireless access point operates under an IEEE802.15 protocol.

9. The apparatus as in claim 8 further comprising a programmed processor of the portable wireless setup device that detects the wireless access point based upon a link quality identifier and saves the unique identifier of the control panel in a memory of the portable wireless setup device.

10. The apparatus as in claim 9 wherein the unique identifier of the control panel read by the portable wireless setup device from the control panel includes a channel number used by the one of the plurality of wireless sensors for registering with the control panel.

11. The apparatus as in claim 9 wherein the unique identifier of the control panel includes a Permanent Account Number identification (PAN-ID) and a Media Access Control identification (MAC-ID) of the control panel.

12. The apparatus as in claim 7 wherein the portable wireless setup device includes a smartphone.

13. The apparatus as in claim 12 wherein the smartphone includes a dongle that operates under an IEEE802.15 protocol.

14. The apparatus as in claim 7 further comprising a respective programmed processor within each of the plurality of wireless sensors that detects the low-power beacon from the portable wireless setup device and saves the unique identifier of the control panel from the portable wireless setup device in a respective memory of each of the plurality of wireless sensors.

15. The apparatus as in claim 7 further comprising each of the plurality of wireless sensors scanning a predetermined frequency spectrum for the low-power beacon from the wireless access point of the security system.

16. An apparatus comprising:
a security system having a plurality of wireless sensors to detect threats within a secured area;
a transceiver coupled to a control panel of the security system that transmits a first beacon within the secured area;
a portable wireless setup device located in the secured area that is carried between the transceiver and a respective location proximate each of the plurality of wireless sensors, wherein the portable wireless setup device receives a unique identifier of the control panel from the first beacon of the control panel and retransmits a low-power beacon containing the unique identifier of the control panel to each of the plurality of wireless sensors when the portable wireless setup device is located at the respective location proximate each of the plurality of wireless sensors; and
a respective programmed processor within each of the plurality of wireless sensors that receives the unique identifier of the control panel from the low-power beacon of the portable wireless setup device and automatically registers a respective one of the plurality of wireless sensors with the control panel through the transceiver based upon the unique identifier received from the portable wireless setup device.

17. The apparatus as in claim 16 wherein the transceiver includes a wireless access point located within the secured area operating under an IEEE802.15 protocol.

18. The apparatus as in claim 16 wherein the unique identifier of the control panel includes a predetermined channel number, a Permanent Account Number identification (PAN-ID), and a Media Access Control identification (MAC-ID).

19. The apparatus as in claim 18 wherein the respective programmed processor within each of the plurality of wireless sensors detects the low-power beacon from the portable wireless setup device and saves the predetermined channel number, the Permanent Account Number identification (PAN-ID), and the Media Access Control identification (MAC-ID) from the portable wireless setup device in a respective memory of the respective one of the plurality of wireless sensors.

20. The apparatus as in claim 19 wherein the respective programmed processor within each of the plurality of wireless sensors registers the respective one of the plurality of wireless sensors with the control panel using the predetermined channel number, the Permanent Account Number identification (PAN-ID), and the Media Access Control identification (MAC-ID).

* * * * *